(12) United States Patent
Bautista et al.

(10) Patent No.: US 10,917,986 B2
(45) Date of Patent: Feb. 9, 2021

(54) DOCK FOR A PORTABLE ELECTRONIC DEVICE

(71) Applicant: ACCO Brands Corporation, Lake Zurich, IL (US)

(72) Inventors: Brian Bautista, South San Francisco, CA (US); Joseph A. Teresi, San Mateo, CA (US); Erik Campbell, San Francisco, CA (US); Wilson Tse, Burnaby (CA); Ben Thacker, San Mateo, CA (US)

(73) Assignee: ACCO BRANDS CORPORATION, Lake Zurich, IL (US)

( * ) Notice: Subject to any disclaimer, the term of this patent is extended or adjusted under 35 U.S.C. 154(b) by 0 days.

(21) Appl. No.: 16/295,167

(22) Filed: Mar. 7, 2019

(65) Prior Publication Data

US 2019/0281715 A1   Sep. 12, 2019

Related U.S. Application Data

(60) Provisional application No. 62/640,338, filed on Mar. 8, 2018.

(51) Int. Cl.
*G06F 1/16* (2006.01)
*G06F 21/88* (2013.01)
(Continued)

(52) U.S. Cl.
CPC ....... *H05K 5/0221* (2013.01); *E05B 73/0082* (2013.01); *G06F 1/1632* (2013.01);
(Continued)

(58) Field of Classification Search
CPC ..... E05B 73/0082; G06F 1/1632; G06F 21/88
See application file for complete search history.

(56) References Cited

U.S. PATENT DOCUMENTS 4,066,231 A * 1/1978 Bahner ................. B43M 99/00
                                                          248/289.11
4,453,692 A   6/1984 LeDoux et al.
(Continued)

FOREIGN PATENT DOCUMENTS

CA    2291365 A    5/2001
GB    2286630 A    8/1995
(Continued)

OTHER PUBLICATIONS

Levin, "Alesis iO Dock II: What's up, Dock?", Audiofanzine <https://en.audiofanzine.com/audio-or-midi-interface-for-tablet-idevice/alesis/io-dock-ii/editorial/reviews/what-s-up-dock.html>, Jun. 8, 2014.
(Continued)

*Primary Examiner* — Adrian S Wilson
(74) *Attorney, Agent, or Firm* — Michael Best & Friedrich LLP

(57) ABSTRACT

A dock for a portable electronic device includes a base and a cradle defining an interior volume configured to house at least a portion of the portable electronic device. The dock further includes an arm rotatably coupled to the base at a first end and rotatably coupled to the cradle at a second end. A security apparatus is configured to be inserted into a slot of the portable electronic device upon insertion of the portable electronic device into the cradle to prohibit removal of the portable electronic device from the dock.

17 Claims, 14 Drawing Sheets

(51) Int. Cl.
 *E05B 73/00* (2006.01)
 *H05K 5/02* (2006.01)
 *H01R 27/02* (2006.01)

(52) U.S. Cl.
 CPC ............ *G06F 1/1675* (2013.01); *G06F 21/88* (2013.01); *H05K 5/0234* (2013.01); *H01R 27/02* (2013.01)

(56) References Cited

U.S. PATENT DOCUMENTS

| | | | |
|---|---|---|---|
| 4,918,954 A | 4/1990 | Stickel et al. | |
| 5,052,199 A * | 10/1991 | Derman | E05B 73/0082 70/19 |
| 5,076,079 A * | 12/1991 | Monoson | E05B 73/0005 248/553 |
| 5,162,976 A * | 11/1992 | Moore | E05B 63/14 361/679.58 |
| 5,347,425 A | 9/1994 | Herron et al. | |
| 5,351,508 A | 10/1994 | Kelley | |
| 5,457,745 A | 10/1995 | Wang | |
| 5,477,415 A | 12/1995 | Mitcham et al. | |
| 5,553,824 A | 9/1996 | Dutra, Jr. | |
| 5,582,044 A | 12/1996 | Bolich | |
| D383,739 S | 9/1997 | Gilgen | |
| 5,708,561 A * | 1/1998 | Huilgol | G06F 1/1616 361/679.07 |
| 5,751,548 A * | 5/1998 | Hall | F16C 11/10 248/122.1 |
| 5,790,375 A | 8/1998 | Lee | |
| 5,816,076 A | 10/1998 | Biedermann et al. | |
| 5,818,691 A | 10/1998 | McMahan et al. | |
| 5,870,283 A | 2/1999 | Maeda et al. | |
| D410,447 S | 6/1999 | Chang | |
| 5,921,697 A | 7/1999 | Karl et al. | |
| 5,946,186 A | 8/1999 | Karl et al. | |
| 5,948,074 A | 9/1999 | Ninomiya | |
| 6,002,921 A | 12/1999 | Pfahlert et al. | |
| 6,006,557 A | 12/1999 | Carl et al. | |
| 6,034,869 A | 3/2000 | Lin | |
| 6,072,695 A | 6/2000 | Steiger et al. | |
| 6,115,247 A | 9/2000 | Helot | |
| 6,125,669 A | 10/2000 | McDaid et al. | |
| 6,138,483 A | 10/2000 | Galant | |
| 6,185,095 B1 | 2/2001 | Helot et al. | |
| 6,212,921 B1 * | 4/2001 | Knighton | E05B 73/0082 248/551 |
| 6,216,499 B1 | 4/2001 | Ronberg et al. | |
| 6,220,883 B1 | 4/2001 | Helot et al. | |
| 6,298,695 B1 | 10/2001 | Vezina et al. | |
| 6,308,928 B1 | 10/2001 | Galant | |
| 6,331,934 B1 | 12/2001 | Helot et al. | |
| 6,393,879 B1 | 5/2002 | William | |
| 6,426,872 B1 | 7/2002 | Sutton et al. | |
| 6,443,417 B2 | 9/2002 | Galant | |
| 6,484,544 B1 | 11/2002 | Wing | |
| 6,490,154 B2 | 12/2002 | Thompson | |
| 6,560,710 B1 | 5/2003 | Leyden et al. | |
| 6,581,420 B1 * | 6/2003 | Ling | E05B 73/0082 248/551 |
| 6,595,423 B2 | 7/2003 | Cho et al. | |
| 6,615,993 B1 | 9/2003 | Rudiger | |
| 6,711,921 B1 | 3/2004 | Yang | |
| 6,744,627 B2 | 6/2004 | Won et al. | |
| 6,763,690 B2 | 7/2004 | Galant | |
| 6,796,536 B1 | 9/2004 | Sevier, IV | |
| 6,848,662 B2 | 2/2005 | Paramonoff et al. | |
| 6,856,506 B2 * | 2/2005 | Doherty | G06F 1/1632 16/329 |
| 6,883,694 B2 | 4/2005 | Abelow | |
| 6,913,238 B2 | 7/2005 | Bakker et al. | |
| 6,967,836 B2 | 11/2005 | Huang et al. | |
| 7,007,912 B1 | 3/2006 | Giuliani et al. | |
| 7,032,872 B2 | 4/2006 | Sullivan | |
| 7,174,752 B2 | 2/2007 | Galant | |
| 7,227,747 B2 * | 6/2007 | Walker | E05B 73/0082 361/679.37 |
| 7,315,443 B2 | 1/2008 | Allen | |
| 7,324,333 B2 | 1/2008 | Allen | |
| 7,443,665 B2 | 10/2008 | Allen | |
| D587,712 S | 3/2009 | Park et al. | |
| 7,506,592 B2 | 3/2009 | Rossini | |
| D589,964 S | 4/2009 | Heggland et al. | |
| 7,566,033 B2 | 7/2009 | Schwager et al. | |
| D599,801 S | 9/2009 | Skaf et al. | |
| D602,938 S | 10/2009 | Ward et al. | |
| 7,614,264 B2 | 11/2009 | McGettrick | |
| 7,679,902 B2 | 3/2010 | Thompson | |
| 7,724,520 B2 | 5/2010 | Allen | |
| 7,787,242 B2 | 8/2010 | Schwager et al. | |
| 7,817,415 B2 | 10/2010 | Chuang | |
| D642,123 S | 7/2011 | Joung | |
| 8,061,164 B2 | 11/2011 | Johnston et al. | |
| 8,139,356 B2 | 3/2012 | Allen | |
| 8,171,762 B2 | 5/2012 | Hsiao et al. | |
| 8,185,681 B2 | 5/2012 | Downing et al. | |
| 8,223,488 B2 | 7/2012 | Peter | |
| D673,567 S | 1/2013 | Yang | |
| 8,369,082 B2 | 2/2013 | Madonna et al. | |
| 8,405,974 B2 | 3/2013 | Sayavong | |
| 8,418,514 B1 * | 4/2013 | Su | E05B 73/0005 70/14 |
| D685,797 S | 7/2013 | Fahrendorff et al. | |
| 8,508,932 B2 | 8/2013 | Duval | |
| 8,602,224 B2 | 12/2013 | Casey | |
| 8,608,119 B2 | 12/2013 | Wolff et al. | |
| 8,717,758 B2 | 5/2014 | Allen | |
| 8,749,963 B2 * | 6/2014 | Staats | G06F 1/1632 248/121 |
| 8,814,128 B2 * | 8/2014 | Trinh | A47F 7/024 248/187.1 |
| 8,837,144 B1 | 9/2014 | Allen | |
| 8,842,011 B2 | 9/2014 | Casey | |
| 8,851,565 B2 * | 10/2014 | Hontz | B60N 3/004 297/188.04 |
| 8,867,202 B2 | 10/2014 | Williams | |
| 8,882,069 B2 | 11/2014 | Mahaffey | |
| 9,030,828 B2 | 5/2015 | Lindblad et al. | |
| 9,032,766 B2 | 5/2015 | Su | |
| D731,490 S | 6/2015 | Kim et al. | |
| 9,105,166 B1 | 8/2015 | Kelsch et al. | |
| 9,128,671 B2 | 9/2015 | Lee | |
| 9,163,433 B2 * | 10/2015 | Sedon | E05B 73/0082 |
| D742,383 S | 11/2015 | Zheng et al. | |
| D742,886 S | 11/2015 | Zheng et al. | |
| 9,194,532 B2 | 11/2015 | Bisesti et al. | |
| 9,206,626 B2 | 12/2015 | Allen | |
| 9,220,358 B2 * | 12/2015 | Wheeler | A47F 7/024 |
| D750,631 S | 3/2016 | Kim et al. | |
| 9,274,556 B2 | 3/2016 | Gallouzi et al. | |
| 9,291,299 B2 | 3/2016 | Richard et al. | |
| 9,304,548 B2 | 4/2016 | Chen et al. | |
| 9,410,344 B2 * | 8/2016 | Stacey | E05B 73/0082 |
| D771,052 S | 11/2016 | Zheng et al. | |
| 9,562,375 B2 | 2/2017 | Allen | |
| 9,568,141 B1 | 2/2017 | Zaloom | |
| 9,581,286 B2 | 2/2017 | Hansen | |
| 9,663,977 B2 | 5/2017 | Vroom | |
| D792,414 S | 7/2017 | Floersch et al. | |
| 9,727,092 B1 | 8/2017 | Gerbus et al. | |
| D803,827 S | 11/2017 | Escolin et al. | |
| 9,811,118 B2 | 11/2017 | Vroom et al. | |
| 9,820,404 B1 | 11/2017 | Wu et al. | |
| 9,898,041 B2 | 2/2018 | Blowers et al. | |
| 10,125,523 B2 | 11/2018 | Allen | |
| 10,222,835 B2 | 3/2019 | Lim et al. | |
| 10,443,274 B2 | 10/2019 | Allen | |
| 10,485,312 B2 | 11/2019 | Rodriguez | F16M 11/041 |
| 10,704,299 B2 | 7/2020 | Allen | |
| 2003/0235029 A1 * | 12/2003 | Doherty | G06F 1/1632 361/679.27 |
| 2004/0007651 A1 | 1/2004 | Williams et al. | |
| 2004/0040350 A1 * | 3/2004 | Derman | E05B 73/0005 70/58 |

(56) References Cited

U.S. PATENT DOCUMENTS

| | | | |
|---|---|---|---|
| 2004/0065126 A1 | 4/2004 | Yang | |
| 2004/0177658 A1 | 9/2004 | Mitchell | |
| 2004/0233631 A1* | 11/2004 | Lord | G06F 1/1632 361/679.41 |
| 2005/0039502 A1* | 2/2005 | Avganim | G06F 21/32 70/58 |
| 2005/0077448 A1 | 4/2005 | Rossini | |
| 2006/0066438 A1* | 3/2006 | Altounian | G06F 21/86 340/5.53 |
| 2006/0256512 A1 | 11/2006 | Esther Kang | |
| 2010/0007613 A1 | 1/2010 | Costa | |
| 2010/0079285 A1 | 4/2010 | Fawcett et al. | |
| 2010/0147041 A1* | 6/2010 | Teicher | E05B 73/0005 70/58 |
| 2010/0195294 A1 | 8/2010 | Sakata et al. | |
| 2011/0143583 A1 | 6/2011 | Zilmer et al. | |
| 2011/0179834 A1* | 7/2011 | Mahaffey | E05B 27/083 70/58 |
| 2011/0185776 A1* | 8/2011 | Mahaffey | E05B 73/0005 70/58 |
| 2012/0026684 A1* | 2/2012 | Matthews | F16M 11/041 361/679.58 |
| 2012/0103863 A1 | 5/2012 | Perez et al. | |
| 2012/0127651 A1* | 5/2012 | Kwon | G06F 1/1632 361/679.43 |
| 2012/0170194 A1* | 7/2012 | Lord | G06F 1/1632 361/679.02 |
| 2012/0175474 A1* | 7/2012 | Barnard | F16M 11/041 248/122.1 |
| 2012/0188689 A1* | 7/2012 | Leung | G06F 1/1632 361/679.01 |
| 2012/0307448 A1* | 12/2012 | Allen | E05B 73/0082 361/679.57 |
| 2013/0026322 A1* | 1/2013 | Wheeler | A47F 7/024 248/289.31 |
| 2013/0107126 A1* | 5/2013 | Nonomura | H04N 5/64 348/725 |
| 2013/0277520 A1 | 10/2013 | Funk et al. | |
| 2013/0301216 A1* | 11/2013 | Trinh | A47F 7/0246 361/679.58 |
| 2014/0118930 A1* | 5/2014 | Sedon | E05B 73/0082 361/679.56 |
| 2014/0168884 A1* | 6/2014 | Wylie | G06F 1/1654 361/679.43 |
| 2015/0002998 A1 | 1/2015 | Arima et al. | |
| 2015/0072555 A1 | 3/2015 | Riddiford et al. | |
| 2015/0076188 A1* | 3/2015 | Venida | A45C 11/34 224/191 |
| 2015/0083885 A1 | 3/2015 | Mahaffey et al. | |
| 2015/0192929 A1 | 7/2015 | Rihn et al. | |
| 2015/0220113 A1 | 8/2015 | Zhao et al. | |
| 2015/0279535 A1 | 10/2015 | Arrington et al. | |
| 2015/0292669 A1 | 10/2015 | Floersch et al. | |
| 2016/0020805 A1 | 1/2016 | Fan | |
| 2016/0161045 A1 | 6/2016 | Lee et al. | |
| 2016/0299540 A1 | 10/2016 | Kim et al. | |
| 2016/0372856 A1* | 12/2016 | DeMeulenaere | H01R 13/443 |
| 2017/0051538 A1 | 2/2017 | Kobayashi et al. | |
| 2017/0247916 A1* | 8/2017 | Kao | G06F 1/1616 |
| 2017/0300082 A1 | 10/2017 | Park et al. | |
| 2018/0031174 A1 | 2/2018 | Sanders | |
| 2019/0078355 A1 | 3/2019 | Allen | |
| 2019/0196534 A1 | 6/2019 | Tseng et al. | |
| 2019/0234553 A1 | 8/2019 | Hallar et al. | |

FOREIGN PATENT DOCUMENTS

| | | |
|---|---|---|
| GB | 2300879 A | 11/1996 |
| JP | H07334265 A | 12/1995 |
| JP | H10143279 A | 5/1998 |
| JP | H10198459 A | 7/1998 |
| JP | H11272363 A | 10/1999 |
| JP | 2000333799 A | 12/2000 |
| JP | 2001344036 A | 12/2001 |
| JP | 2003000405 A | 1/2003 |
| JP | 2003044173 A | 2/2003 |
| JP | 3101784 U | 6/2004 |
| KR | 1998-0018730 U | 7/1998 |
| KR | 2004-0005519 A | 1/2004 |
| KR | 2004-0108174 A | 12/2004 |
| WO | 2002035037 A1 | 5/2002 |
| WO | 2018048436 A1 | 3/2018 |

OTHER PUBLICATIONS

Howse, "Quick Look: Kensington SD7000 Surface Pro Docking Station", AnandTech, <https://www.anandtech.com/show/13725/quick-look-kensington-sd7000-surface-pro-docking-station>, Dec. 17, 2018.

Acer, "Aspire R 13 Laptops", <www.acer.com/ac/en/US/content/series/aspirer13>, web-page publicly available at least as early as Jan. 15, 2016.

Dell, "XPS 12 Ultrabook Convertible", <www.dell.com/en-us/shop/cty/pdp/spd/xps-12-l221x>, web-page publicly available at least as early as Sep. 5, 2017.

Microsoft, "Surface Studio", <www.microsoft.com/en-us/surface/devices/surface-studio/overview>, web-page publicly available at least as early as Oct. 29, 2016.

Norr, Henry, "This Handheld Computer Has Style/Vadem's Clio sells for $999, goes from laptop to digital tablet", SFGate, <www.sfgate.com/business/article/This-Handheld-Computer-Has-Style-Vadem-s-Clio-2978836.php>, Nov. 12, 1998.

Think Products Inc., "First Amended Complaint for Patent Infringement", United States District Court for the Nothern District of Illinois Eastern Division, Nov. 14, 2019 (14 pages).

* cited by examiner

DOCK FOR A PORTABLE ELECTRONIC DEVICE

CROSS-REFERENCE TO RELATED APPLICATIONS

This application claims priority to U.S. Provisional Patent Application No. 62/640,338, filed Mar. 8, 2018, the entire contents of which are incorporated by reference herein.

FIELD OF THE INVENTION

The present invention relates to docking stations for portable electronic devices.

SUMMARY

In one embodiment, the invention provides a dock for a portable electronic device. The dock includes a base and a cradle defining an interior volume configured to house at least a portion of the portable electronic device. The dock further includes an arm rotatably coupled to the base at a first end and rotatably coupled to the cradle at a second end. A security apparatus is configured to be inserted into a port of the portable electronic device upon insertion of the portable electronic device into the cradle to prohibit removal of the portable electronic device from the dock.

In another embodiment, the invention provides a dock for a portable electronic device. The dock includes a base configured to rest upon a work surface, a cradle having a lower channel, a first side channel extending perpendicularly from a first end of the lower channel, and a second side channel extending perpendicularly from a second end of the lower channel opposite the first end, and an arm rotatably coupled to the base at a first end and rotatably coupled to the cradle at a second end. Each of the lower channel, the first side channel, and the second side channel is configured to accept an edge of the portable electronic device.

In yet another embodiment, the invention provides a method of docking a portable electronic device to a dock. The dock includes a base, an arm rotatably coupled to the base, a cradle mounted to the base via the arm, and a locking apparatus supported by the cradle and having an electrical connector. The method includes positioning the locking apparatus in a disengaged position such that the electrical connector does not extend into a channel defined by the cradle, inserting the portable electronic device into the cradle such that the cradle at least partially surrounds a plurality of the sides of the portable electronic device, moving the locking apparatus into an engaged position such that the electrical connector extends into the channel and engages the portable electronic device, and locking the locking apparatus in the engaged position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
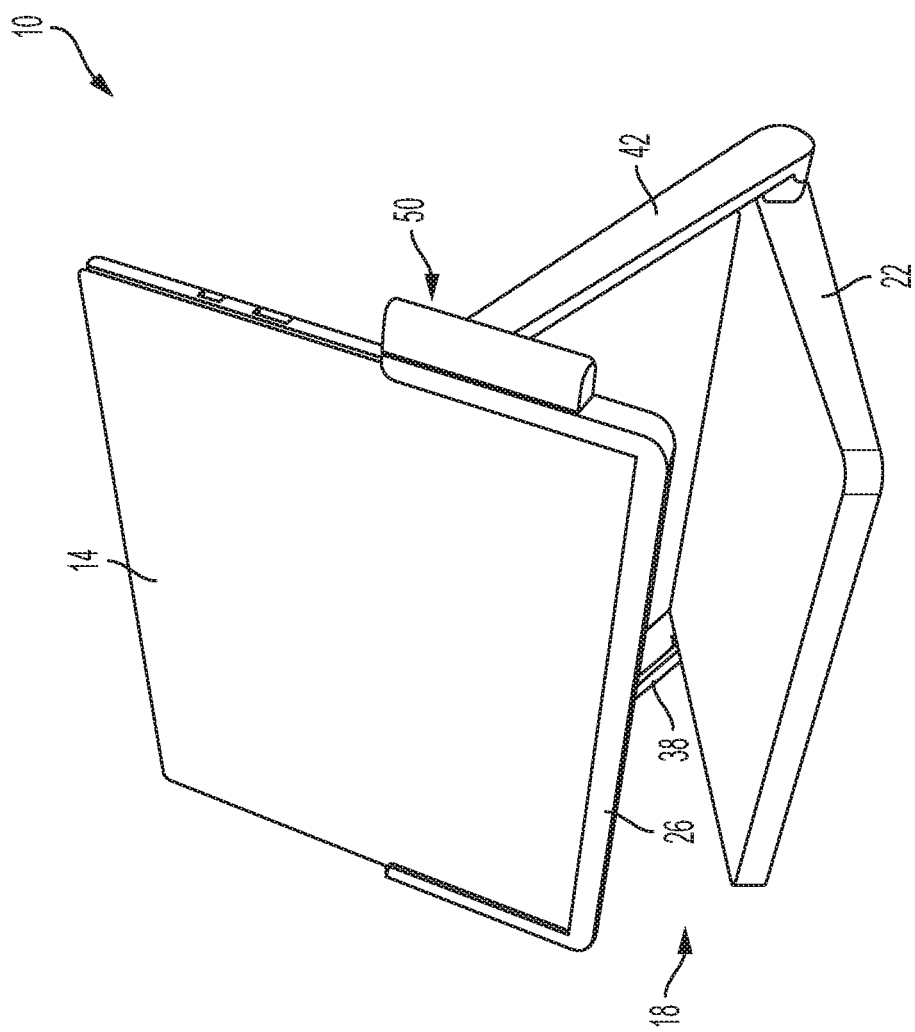
FIG. 1 is a perspective view of a system including a portable electronic device and a dock.

FIG. 1 illustrates a system 10 including a portable electronic device 14 and a dock 18. The illustrated portable electronic device 14 is a tablet computer. In other embodiments, the portable electronic device 14 may be another type of device, such as a smartphone, an eReader, an MP3 player, and the like.

The dock 18 attaches to the portable electronic device 14 to secure the device 14 and to support the portable electronic device 14 in a plurality of positions for presentation, operation, and/or storage. In the illustrated embodiment, the dock 18 includes a base 22, a cradle 26, and one or more arms 38, 42 extending between the base 22 and the cradle 26.

Figure 2:
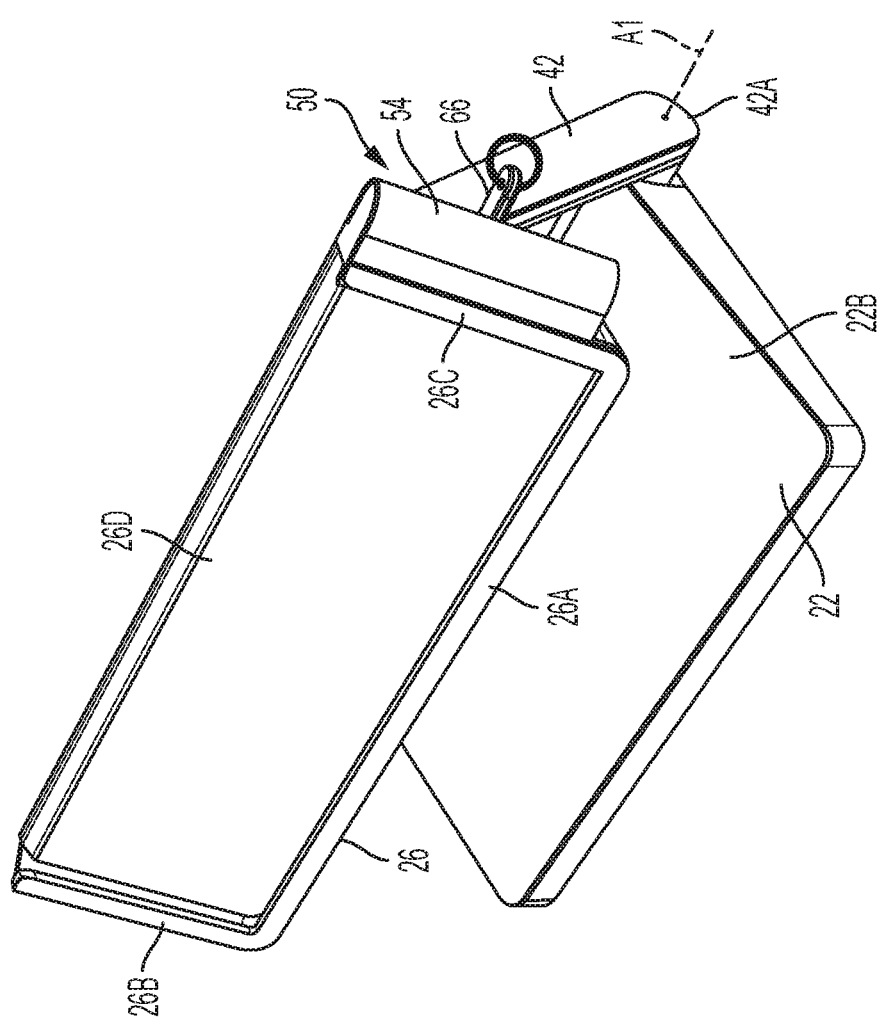
FIG. 2 is a perspective view of the dock shown in FIG. 1.
Figure 3:
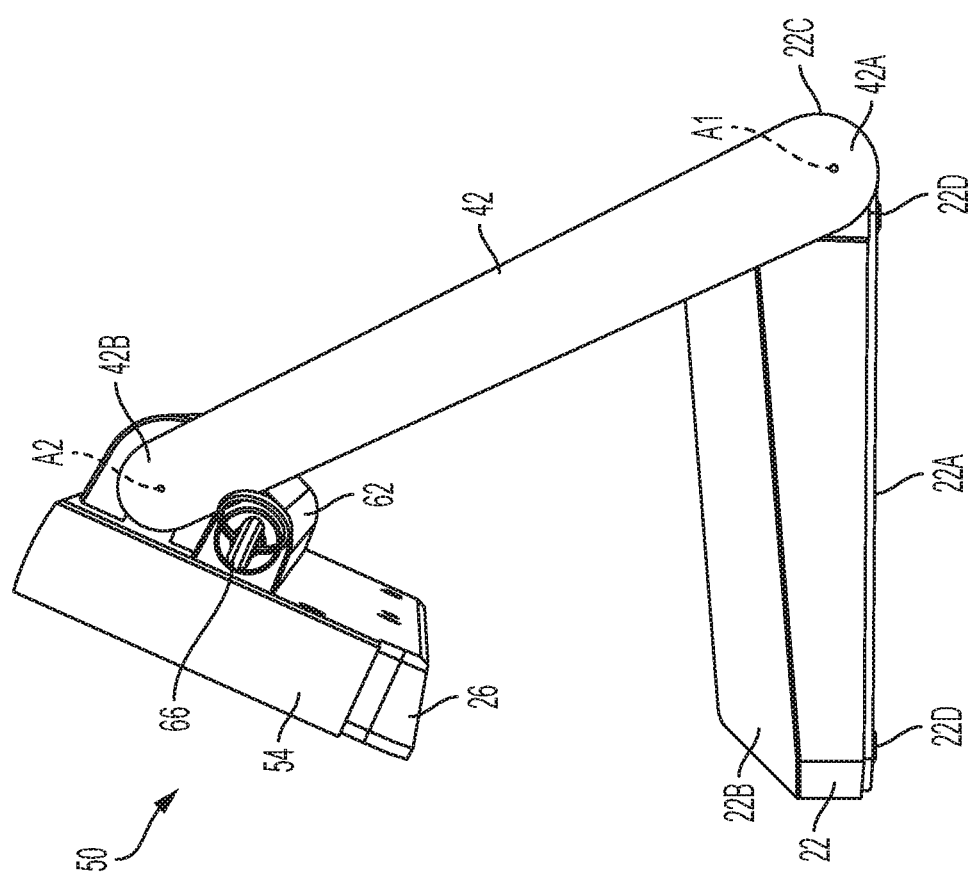
FIG. 3 is a side view of the dock shown in FIG. 1.
Figure 4:
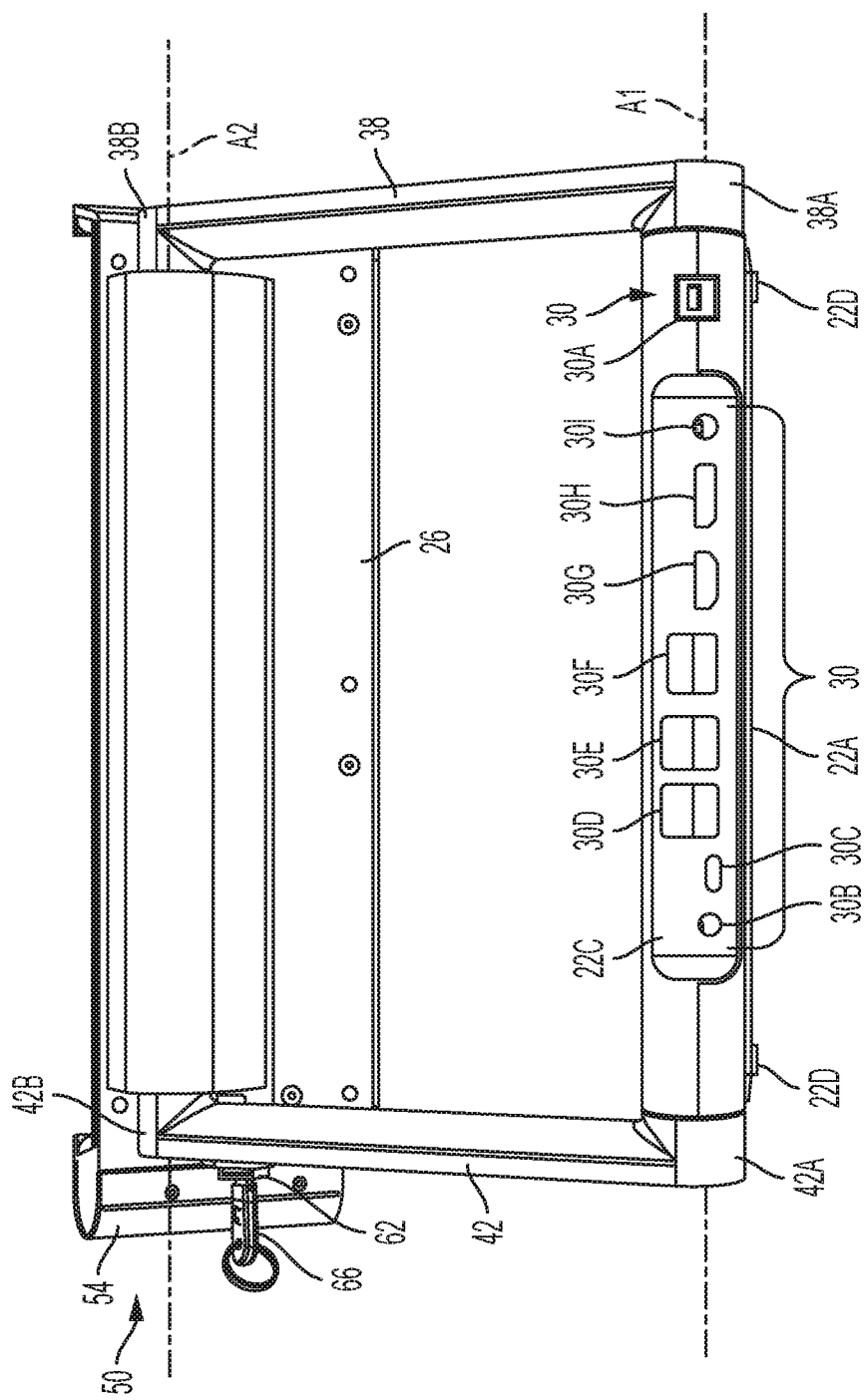
FIG. 4 is a rear view of the dock shown in FIG. 1

As shown in FIGS. 2-4, the base 22 includes a flat lower surface 22A adjacent to or contacting a work surface, such as a desk. The lower surface 22A may be provided with feet 22D or an anti-skid material to limit inadvertent movement of the dock 18 relative to the work surface. An upper surface 22B of the base 22 is opposite the lower surface 22A. A rear surface 22C of the base 22 extends between the lower and upper surfaces 22A, 22B. The rear surface 22C supports and presents a plurality of ports 30.

Figure 9:
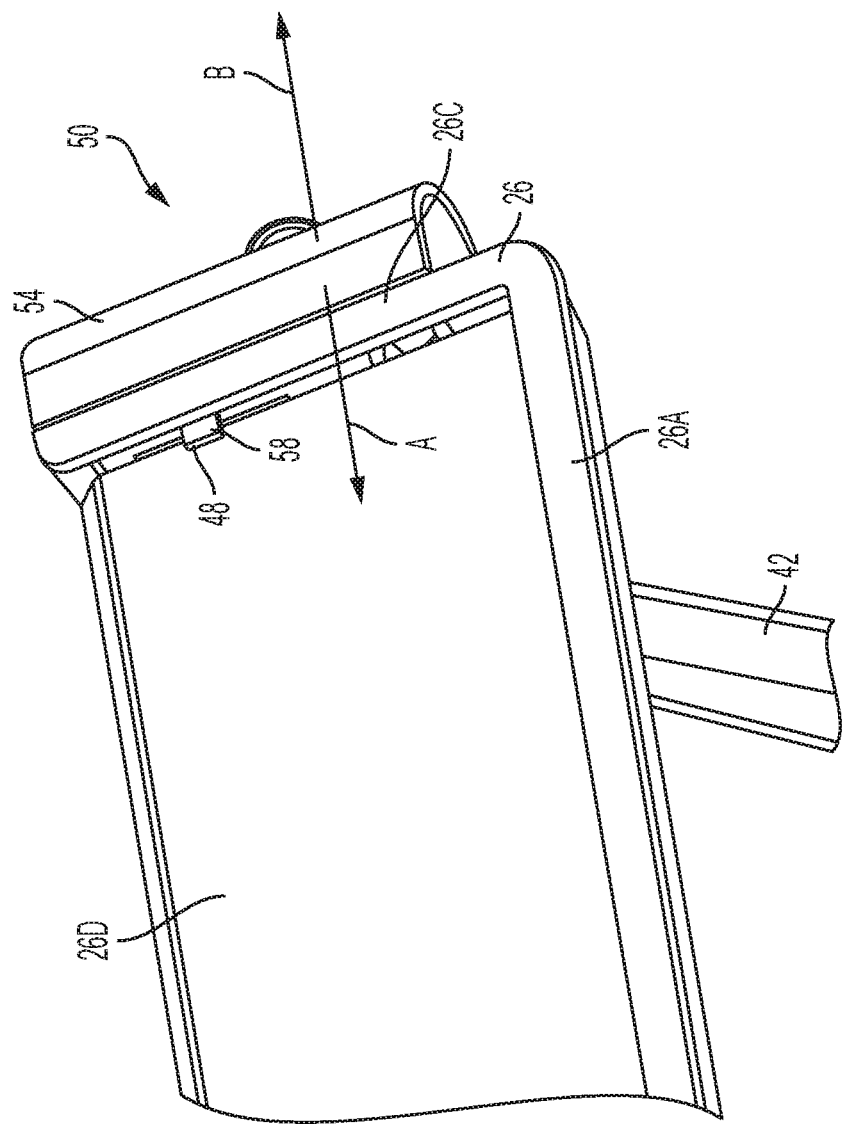
FIG. 9 is a partial perspective view of the cradle illustrating a security apparatus.

As shown in FIG. 4, a lock-slot 30A is provided on the base 22. A security apparatus (not shown) may be inserted into the lock-slot 30A for fixing the dock 18 to an immovable object to inhibit theft of the dock 18 and/or the portable electronic device 14 positioned in the dock 18. In some embodiments, the security apparatus may be, for example, a laptop lock having a security cable, such as the MicroSaver® or ClickSafe® laptop locks sold by Kensington®. The remainder of the ports 30B-30L provide attachment points for peripheral electrical devices for interfacing with the portable electronic device 14 via an electrical connector 48 (FIG. 9). For example, a power port 30I and/or a power and data transmission port 30C (e.g., USB C port, USB C 3.1 port, etc.) are provided for charging the portable electronic device 14. Further ports 30D-30L (e.g., USB ports 30D, 30E, Ethernet port 30F, HDMI port 30G, Display Port 30H, and Audio In/Out port 30B) and additional slots (e.g., SD card slot; not shown) provide the ability to connect the portable electronic device 14 to peripherals such as SD cards, monitors, projectors, keyboards, a computer mouse and other pointer devices, routers, and audio devices such as speakers. Further, the base 22 may support internal electrical components such as a wireless transceiver and an internal storage device.

The cradle 26 is sized to accept the portable electronic device 14 in a specific orientation. As shown in FIG. 1, the cradle 26 is sized to accept the electronic device 14 in a landscape orientation. Alternatively, the cradle 26 may be sized to accept the electronic device 14 in a portrait orientation, or may otherwise be expandable, scalable, or non-rigid (e.g., having some elasticity) to accept the electronic device 14 in either orientation.

As shown in FIG. 2, the cradle 26 includes a lower section 26A defining a lower channel (e.g., a U-shaped channel having three sides at 90 degrees to one another) for supporting and surrounding a lower side or edge of the portable electronic device 14. The cradle 26 further includes first and second side sections 26B, 26C extending parallel to one another from the lower section 26A. The first and second side sections 26B, 26C further define side channels in facing relation to one another. The first side section 26B extends perpendicularly from a first end of the lower section 26A, and the second side section 26C extends perpendicularly from a second end of the lower section 26A that is opposite the first end. The lower and side sections 26A, 26B, 26C collectively form the cradle 26 defining an interior volume to at least partially surround the portable electronic device 14 on three of the four edges of the electronic device 14. For example, as shown in FIG. 1, the portable electronic device 14 is surrounded completely on the lower edge and is partially surrounded on the side edges. The channels may contain a compressible material (e.g., a rubber or elastomeric strip) at discrete locations within the channels or along the length of the channels to snugly secure the portable electronic device 14 within the channels. The compressible material may also reduce the possibility of marring the portable electronic device 14 as the device 14 is inserted into and removed from the cradle 26.

As shown in FIG. 2, the cradle 26 further includes a rear wall 26D that spans the distance between the lower and side sections 26A, 26B, 26C at a location behind the channels. The rear wall 26D provides a backrest for the portable electronic device 14 to further support the portable electronic device 14. In some embodiments, the rear wall 26D may include a relatively soft material (e.g., foam) and/or a tacky material (e.g., rubber) to inhibit the portable electronic device 14 from unintentionally slipping out of the cradle 26. The soft or tacky material also inhibits the cradle 26 from marring surfaces of the portable electronic device 14.

With reference again to FIGS. 2-4, the illustrated dock 18 includes two arms 38, 42. In some embodiments, the dock 18 may only include one arm. The arms 38, 42 support the cradle 26 relative to the base 22 and are identical to one another except as otherwise described. Each arm 38, 42 includes a lower end 38A, 42A and an upper end 38B, 42B opposite the respective lower end 38A, 42A. The body of each arm 38, 42 is elongated between the lower and upper ends 38A, 42A, 38B, 42B. The lower end 38A, 42A of each arm 38, 42 is rotatably fixed to the base 22 at a first pivot point defining a first axis A1. The arms 38, 42 may rotate, for example, within a range from 0-80 degrees from the base 22. The upper end 38B, 42B of each arm 38, 42 is rotatably fixed to the cradle 26 at a second pivot point defining a second axis A2. The cradle 26 may rotate, for example, within a range from 160-50 degrees from the arms 28, 42. The first and second axes A1, A2 are parallel with one another. The first and second axes A1, A2 are also offset from one another. The rigidity of the base 22, cradle 26, and arms 38, 42 generates similar motions between the first and second arms 38, 42 when one or the other of the arms 38, 42 is rotated, or when the cradle 26 is rotated relative to the base 22.

The dock 18 is configured to transition between a range of positions and is operable to hold a plurality of positions within the range. The arms 38, 42 are rotatable relative to the base 22 about the first axis A1 along a first range of positions. In the illustrated embodiment, a friction hinge defines the first axis A1 so that the arms 38, 42 may hold firm at any point along the first range, requiring a force greater than the cantilevered weight of the portable electronic device 14 in the cradle 26 to move from one position to another. Alternatively, the first axis A1 may have discrete detents spaced apart from one another for holding the arms 38, 42 relative to the base 22 at the discrete points. The force to overcome the detent force to move from one detent to the next is likewise greater than the cantilevered weight of the portable electronic device 14 in the cradle 26. Similarly, the cradle 26 is rotatable relative to the arms 38, 42 about the second axis A2 along a second range of positions, and may be supported in position by a holding mechanism such as a friction hinge or discrete detents. The embodiment shown in FIGS. 2-4 utilizes a friction hinge.

Figure 5:
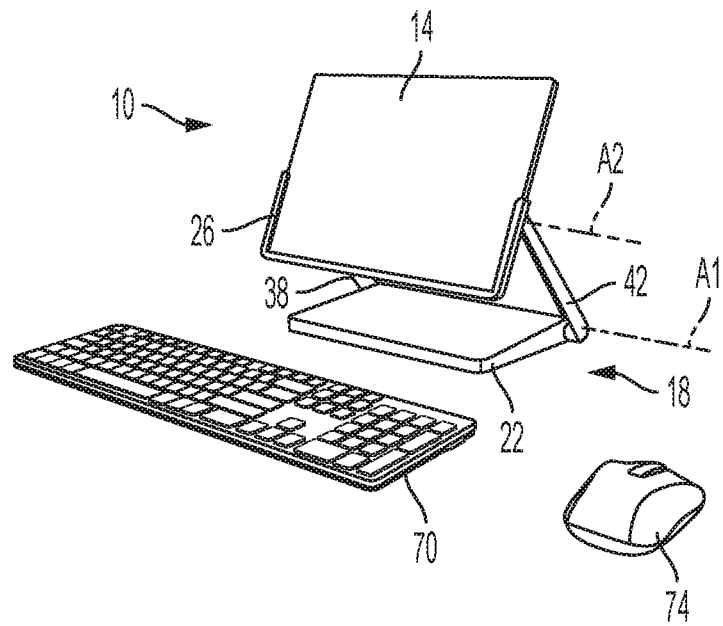
FIG. 5 is a perspective view of the system shown in FIG. 1 with peripheral devices, and further with the dock in a vertical desktop orientation.
Figure 6:
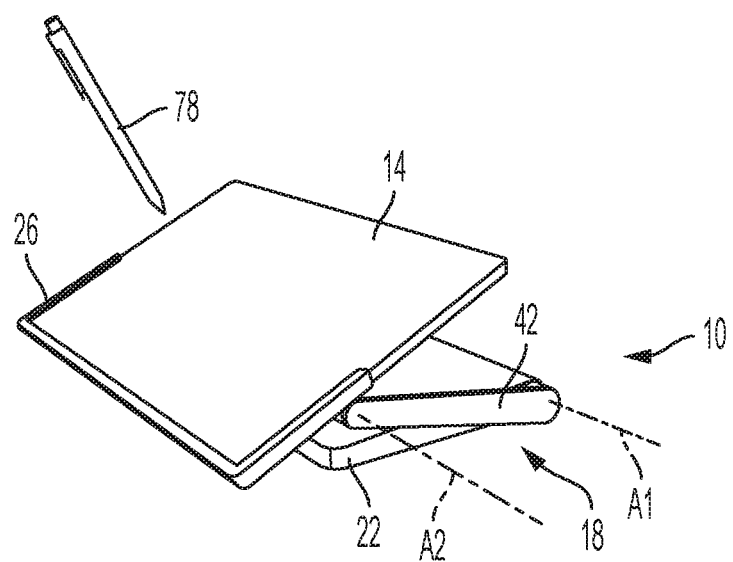
FIG. 6 is a perspective view of the system shown in FIG. 1 with a peripheral device, and further with the dock in a horizontal tablet orientation.

As shown in FIGS. 5-6, some of the positions within the range of positions may include a standing desktop orientation (FIG. 5) and a reclined tablet orientation (FIG. 6). The standing desktop orientation, as shown, may be useful for a desktop application for use with discrete peripherals such as a keyboard 70 and a mouse 74. In the standing orientation, the portable electronic device 14 is docked in a vertical or near vertical orientation (i.e., an orientation in which the screen or front face of the portable electronic device 14 is less than 45 degrees from vertical; vertical being defined as perpendicular to the surface upon which the lower surface 22A of the dock 18 rests). The standing orientation is produced by rotating the arms 38, 42 relative to the base 22 around the first axis A1 such that the cradle 26 is spaced above the base 22 and rotating the cradle 26 about the second axis A2 such that the portable electronic device 14 is oriented at or near the vertical orientation.

In the reclined orientation, the system 10 may be useful for direct interaction with the portable electronic device 14. As shown in FIG. 6, a user may use a stylus 78 or other input device (e.g., finger) directly on the surface (e.g., screen) of the portable electronic device 14. In the reclined orientation, the portable electronic device 14 is docked in a horizontal or near horizontal orientation (i.e., an orientation in which the screen or front face of the portable electronic device 14 is less than 45 degrees from horizontal; horizontal being defined as perpendicular to vertical). To transition from the standing orientation to the reclined orientation, the cradle 26 is rotated about the second axis A2 such that the portable electronic device 14 is oriented at or near the horizontal orientation and the arms 38, 42 are rotated about the first axis A1 such that the cradle 26 is adjacent to (or directly contacts) the base 22.

Figure 15:
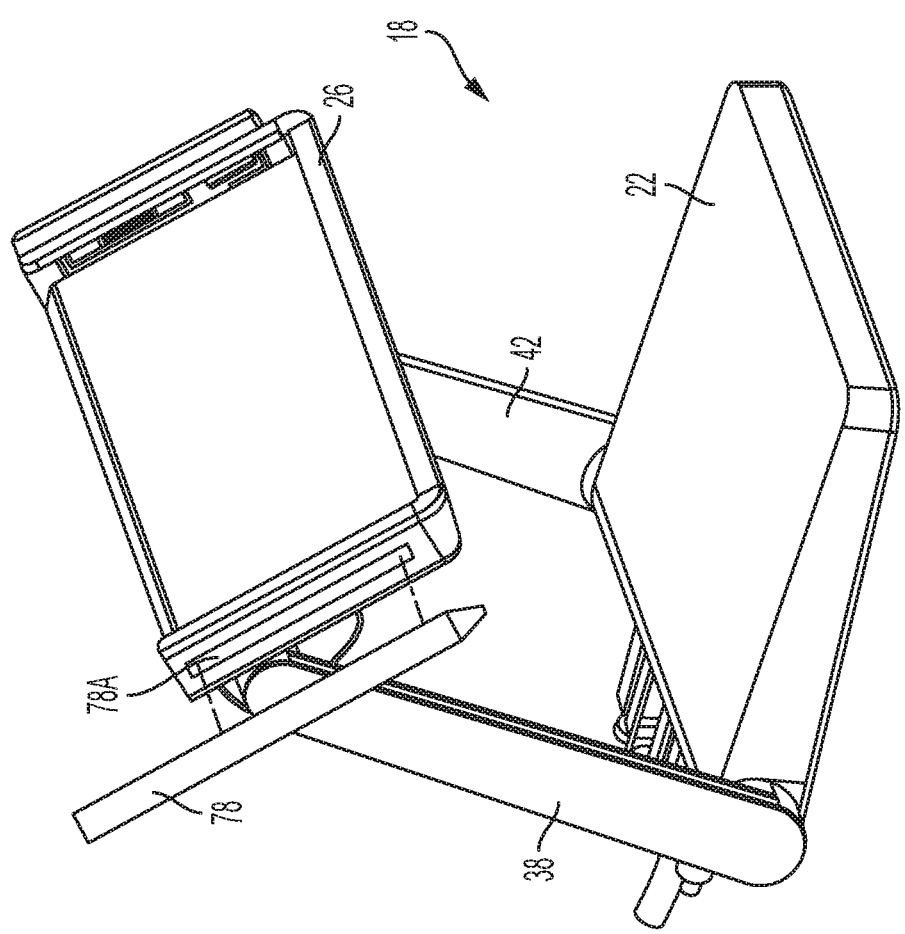
FIG. 15 is a perspective view of the dock and a stylus.

As shown in FIG. 15, the dock 18 may include a coupling member on the dock 18 as a mounting location for an input device, such as the stylus 78. In the illustrated embodiment, the coupling member includes a ferrous metal strip 78A. As shown, the ferrous metal strip 78A may be adhered to an external side of the cradle 26 or embedded in a side of the cradle 26. The stylus 78 (or other input device) may include magnets or a magnetic surface for engaging the metal strip 78A and storing the stylus 78 relative to the dock 18. In other embodiments, the dock 18 may include other suitable coupling members, such as a U-shaped clip, a sleeve, hook and loop fasteners (e.g., Velcro®), and the like. In further embodiments, the coupling member may be located elsewhere on the dock 18.

Figure 7:
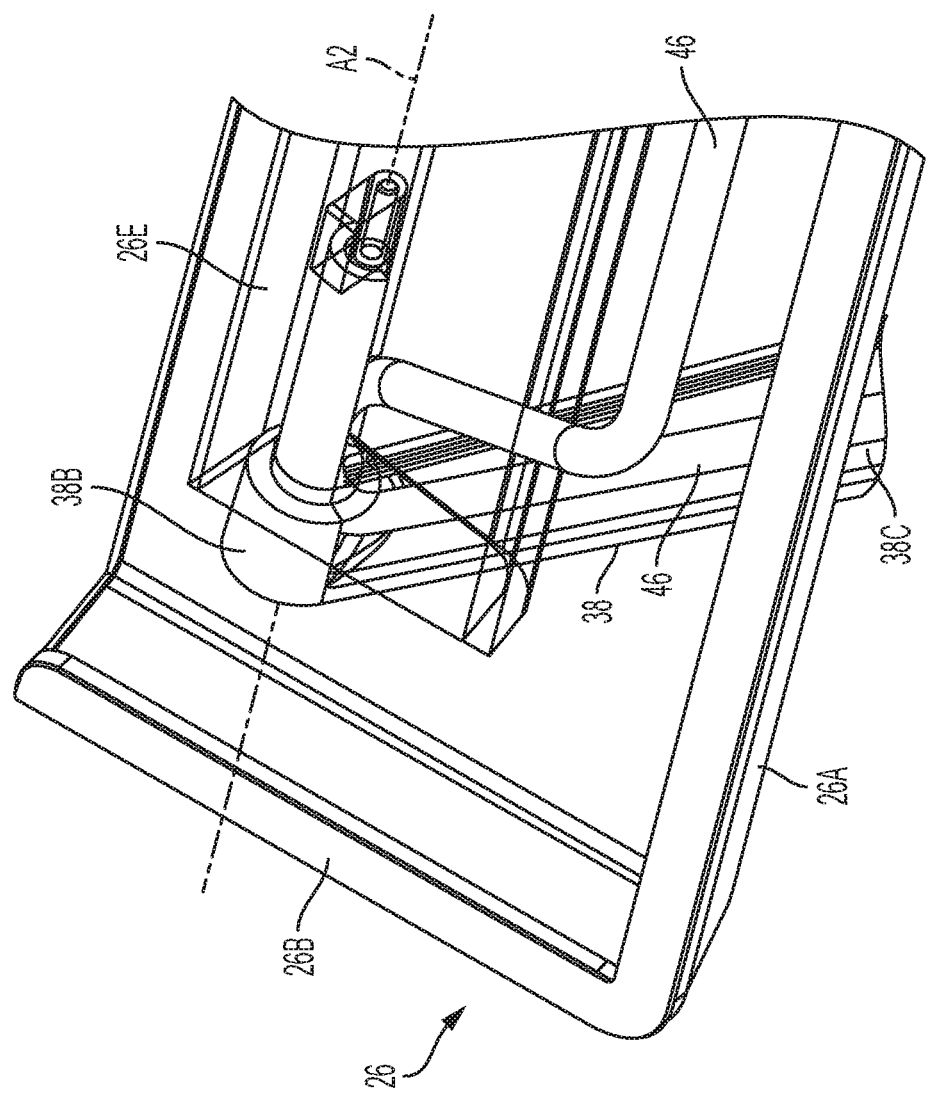
FIG. 7 is a partially deconstructed perspective view of a portion of a cradle of the dock, illustrating a path for an electrical wire at an upper hinge point.
Figure 8:
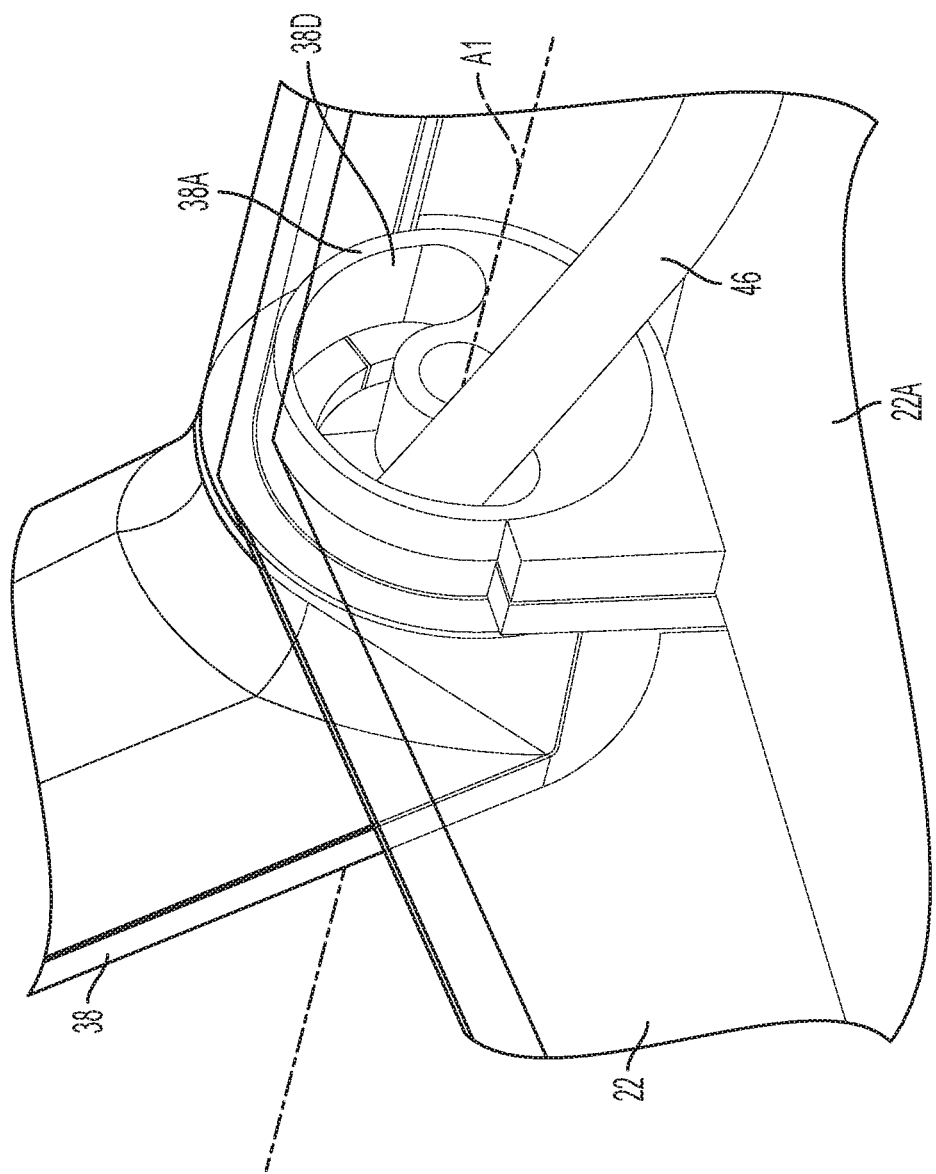
FIG. 8 is a partially deconstructed perspective view of a portion of a base of the dock, illustrating a path for the electrical wire at a lower hinge point.
Figure 14:
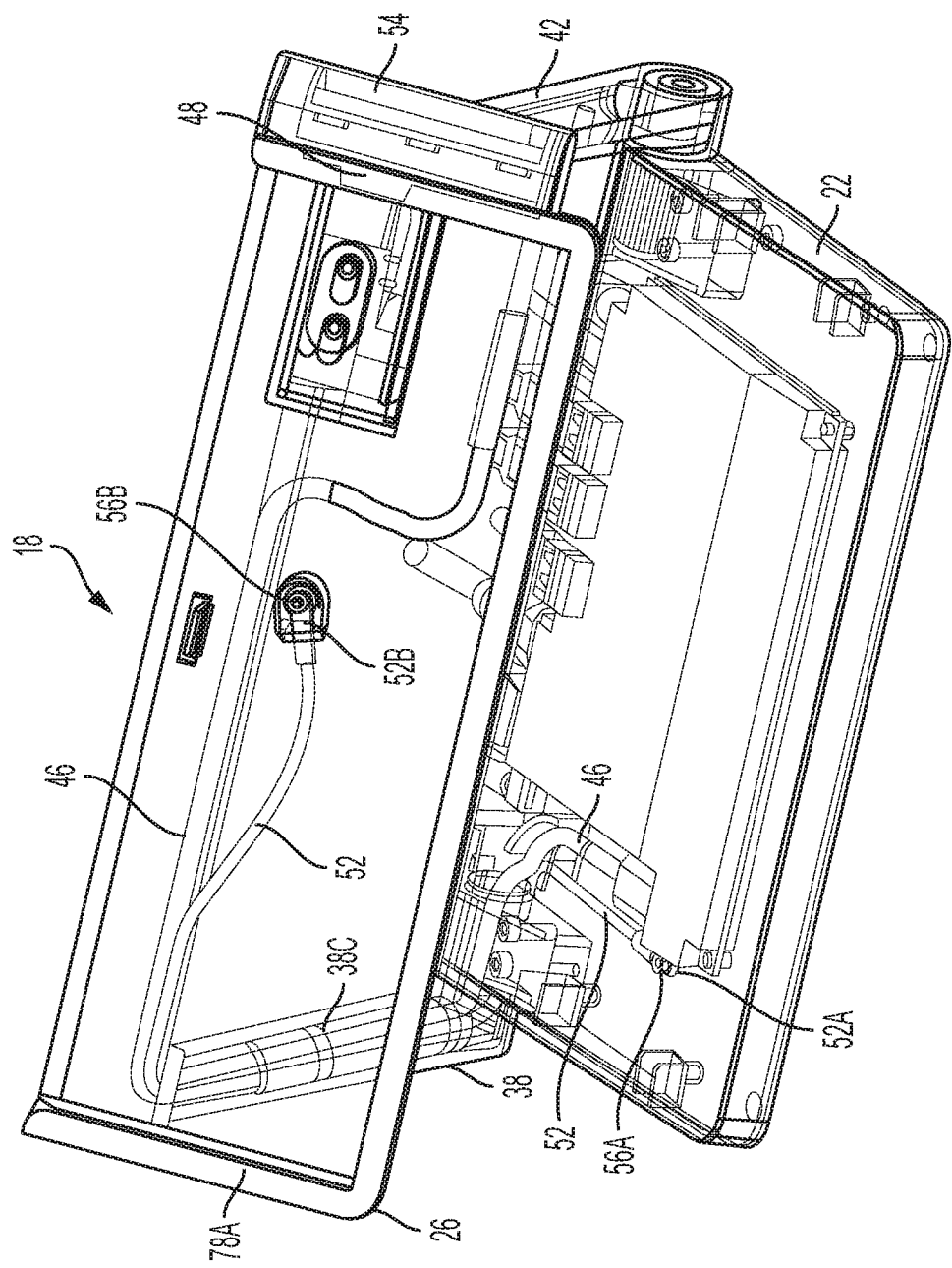
FIG. 14 is a perspective view the dock, where portions of the dock are transparent to show internal components of the dock.

As shown in FIGS. 7-8, at least one of the arms 38, 42 (as shown the first arm 38) includes a pathway 38C extending from the upper end 38B to the lower end 38A. The pathway 38C is configured for routing electrical wiring 46. As shown in FIG. 14, the pathway 38C may also be used for routing a security cable 52. The electrical wiring 46 includes one or more electrical wires or ribbons and extends from a first end within the base 22 (and, more particularly, connected to the ports 30A-30L and any internal electrical components such as a wireless transceiver or storage devices in the base 22), through a semi-circular opening 38D at the lower end 38A of the arm 38 (FIG. 8), through the arm 38, through an aperture 26E in the rear section 26D of the cradle 26 (FIG. 7), and to a second end located at the cradle 26. The second end of the wiring 46 terminates in a data transmission apparatus or electrical connector 48 (FIG. 9). The electrical connector 48 may be connected to the portable electronic device 14 mounted within the cradle 26 for transmitting data, power, or both data and power connections from the electronic device 14 to the ports 30A-30L.

In addition to or in replacement of the electrical wiring 46, the cradle 26 may be provided with a wireless data and/or power transmission device to communicate with the ports 30B-30L in the base 22 of the dock 18.

As shown in FIG. 14, the security cable 52 extends through the same pathway 38C as the electrical wiring 46. Alternatively, the security cable 52 may extend through a different pathway within the same arm 38 or through a separate pathway in the other arm 42. The security cable 52 is a cut-resistant cable (e.g., made of woven or braided steel) and extends from a first end 52A within the base 22 to a second end 52B within the cradle 26. The first end 52A includes a loop and is affixed around a component such as a post or fastener 56A (e.g., screw, rivet) within the base 22. The second end 52B likewise includes a loop and is affixed to a component such as a post or fastener 56B (e.g., screw, rivet) within the cradle 26. The security cable 52 fixes the base 22 relative to the cradle 26 (and the portable electronic device 14 locked to the cradle 26) to inhibit unwanted disassembly of the base 22 from the cradle 26.

Figure 10A:
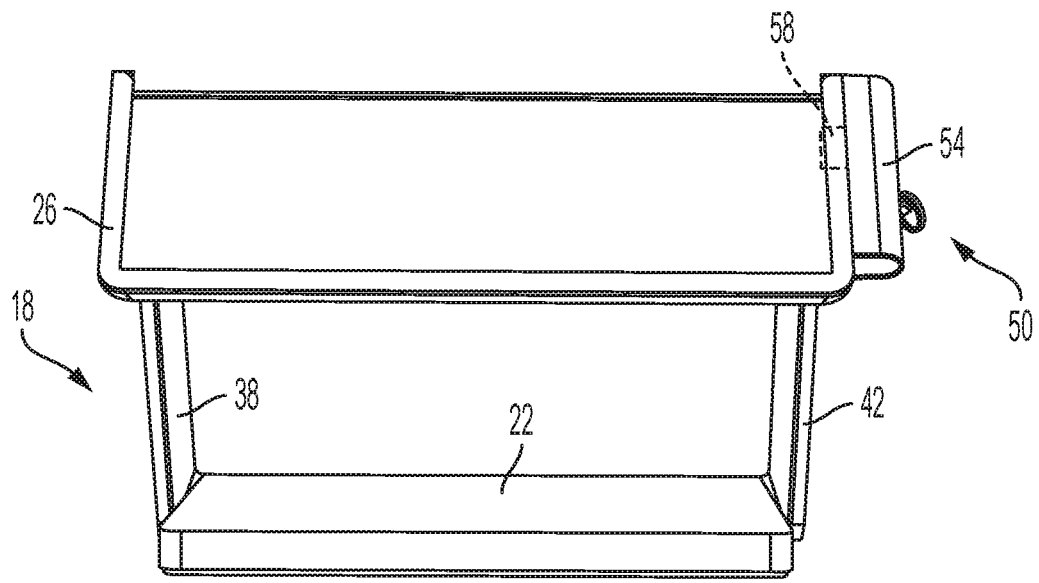
FIG. 10A is a front view of the dock shown in FIG. 1 with the security apparatus in an engaged position
Figure 10B:
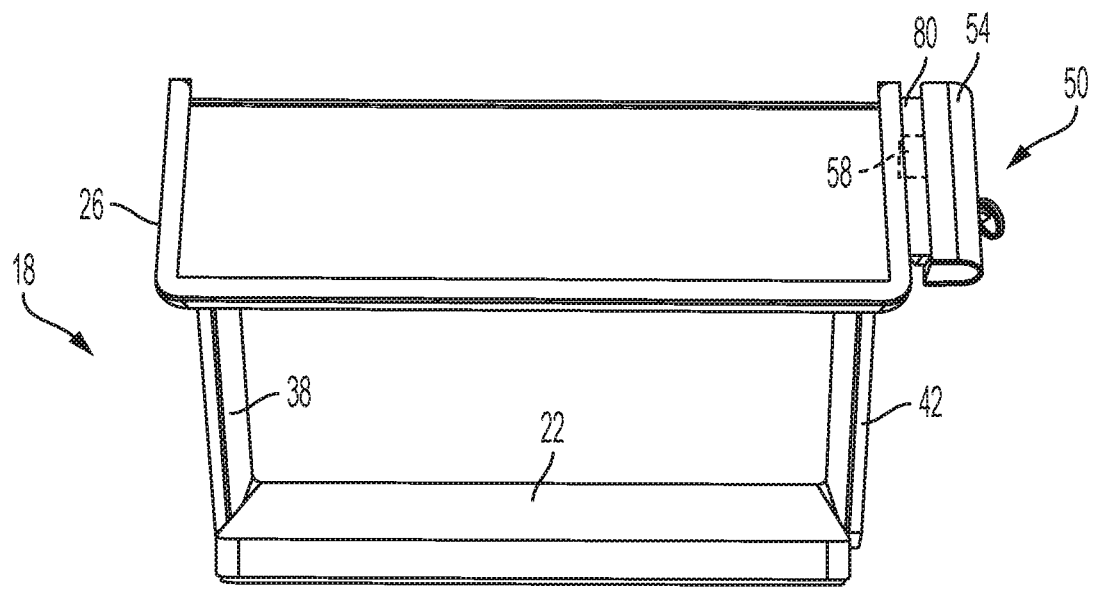
FIG. 10B is a front view of the dock shown in FIG. 1 with the security apparatus in a disengaged position

As shown in FIGS. 1-4 and FIG. 9, the dock 18 includes a security apparatus 50 mounted to the cradle 26. In the illustrated embodiment, the security apparatus 50 is mounted to the second side section 26C of the cradle 26. In other embodiments, the security apparatus 50 may be mounted elsewhere on the cradle 26, such as the lower section 26A, the first side section 26B, or the rear wall 26D. The illustrated security apparatus 50 includes a security apparatus housing 54, a lock head 58, and a locking mechanism 62. The housing 54 is mounted to the cradle 26 and is movable (e.g., slidable, rotatable, etc.) relative to the cradle 26 between an engaged position (FIG. 10A) and a disengaged position (FIG. 10B). In the illustrated embodiment, the housing 54 is movable toward and away from the cradle 26 in the direction of arrows A and B (FIG. 9). The lock head 58 is coupled to the housing 54. As shown, the lock head 58 includes the electrical connector 48. In other embodiments, the lock head 58 may be an alternative security anchor.

As shown in FIG. 10B, in the disengaged position, the security apparatus housing 54 and the lock head 58 are spaced away from the channel of the cradle 26 such that the portable electronic device 14 is insertable and removable from the channel of the cradle 26 without interference from the security apparatus 50. A spacer 80 is fixed to the housing 54 and shrouds the lock head 58 (shown in hidden lines in FIGS. 10A-10B) when the housing 54 is in the disengaged position. After the portable electronic device 14 is inserted into the cradle 26, the housing 54 and lock head 58 are moved (e.g., automatically via a motor or spring, manually by pressing the housing 54, etc.) toward the channel to the engaged position (FIG. 10A) to engage the lock head 58 with the electronic device 14. When the lock head 58 includes the electrical connector 48, moving the lock head 58 to the engaged position includes inserting the electrical connector 48 into a mating electrical connector port on the portable electronic device 14. As noted above, the electrical connector 48 is connected to the ports 30 (FIG. 4) of the dock 18 via the electrical wiring 46 (FIG. 14). When the lock head 58 is moved to the engaged position, the electrical connector 48 thereby connects the portable electronic device 14 to the ports 30.

Alternatively, if the lock head 58 does not include the electrical connector 48, engaging the lock head 58 with the electronic device 14 includes moving the lock head 58 relative to the portable electronic device 14 to a position that inhibits removal of the portable electronic device 14. This may include positioning the lock head 58 into the portable electronic device 14, into a slot or groove defined by the portable electronic device 14, or above a portion (e.g., lip or shoulder) of the portable electronic device 14 to inhibit removal of the portable electronic device 14 from the cradle 26.

Figure 12:
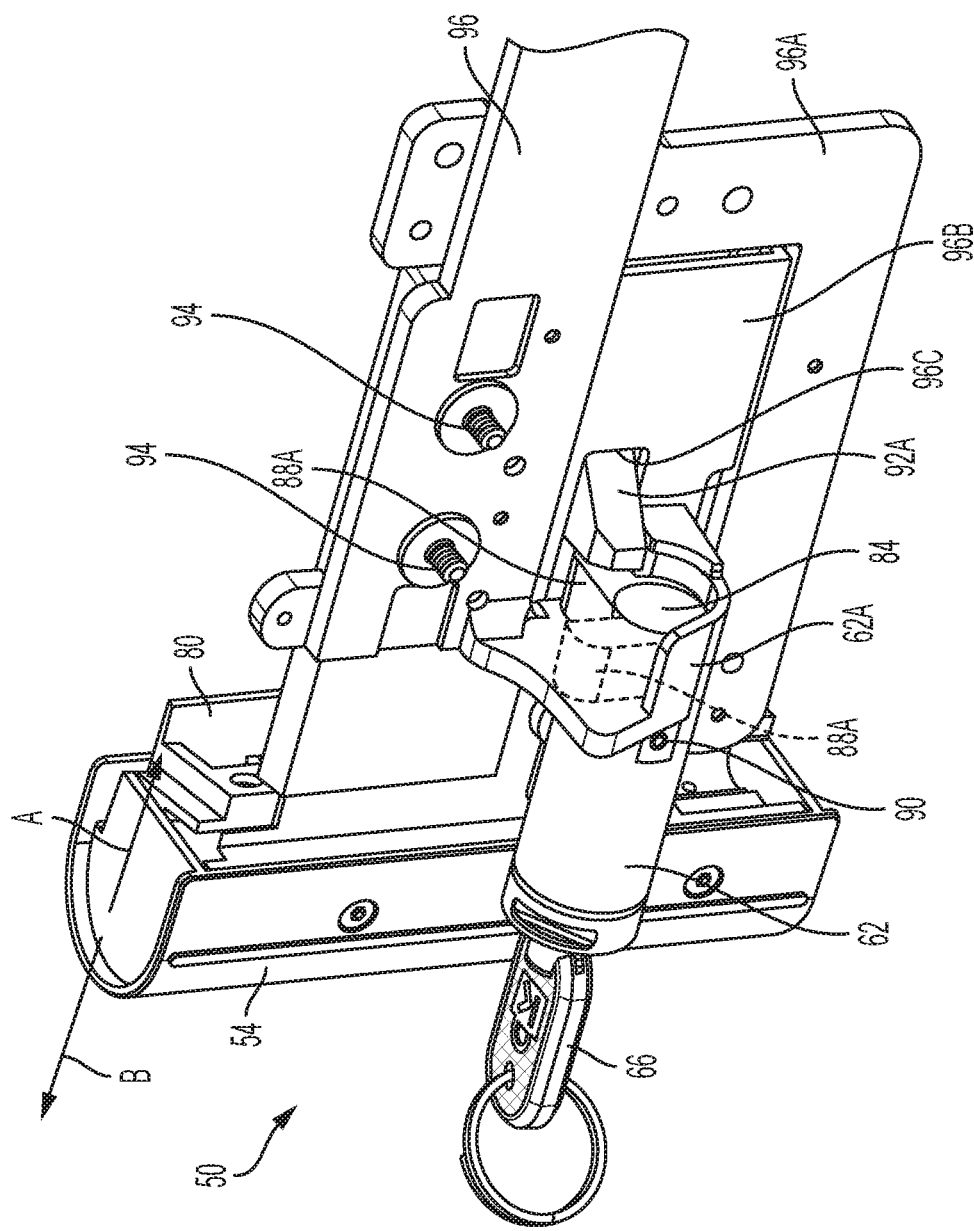
FIG. 12 is a partially deconstructed perspective view of various additional aspects of the security apparatus of FIG. 11.

As shown in FIG. 12, the locking mechanism 62 is mounted to the rear section 26D of the cradle 26 adjacent to the housing 54. The locking mechanism 62 includes a cam 84 that is rotatable between a first position and a second position. The first position corresponds to an unlocked position in which the housing 54 and the lock head 58 are free to move between the engaged and the disengaged positions. The second position corresponds to a locked position in which the housing 54 and the lock head 58 are locked in the engaged position. The cam 84, and more specifically, a lobe 88A of the cam 84 is illustrated in FIG. 12 in both the first position (illustrated in dashed lines) and the second position (illustrated in solid lines) of the cam 84. The lobe 88A engages with the housing 54 or with an element, such as a plate or bracket 92 fixed to the housing 54, when the cam 84 is in the second position to block movement of the housing 54 from the engaged position. The lobe 88A further rests against a portion 62A of the locking mechanism 62 when the locking mechanism 62 is in the first position. The portion 62A of the locking mechanism functions as a guide along which the locking mechanism 62 rotates between the first and second positions. A set screw 90 retains the lobe 88A in place and further limits the rotation of the lobe 88A.

Figure 11:
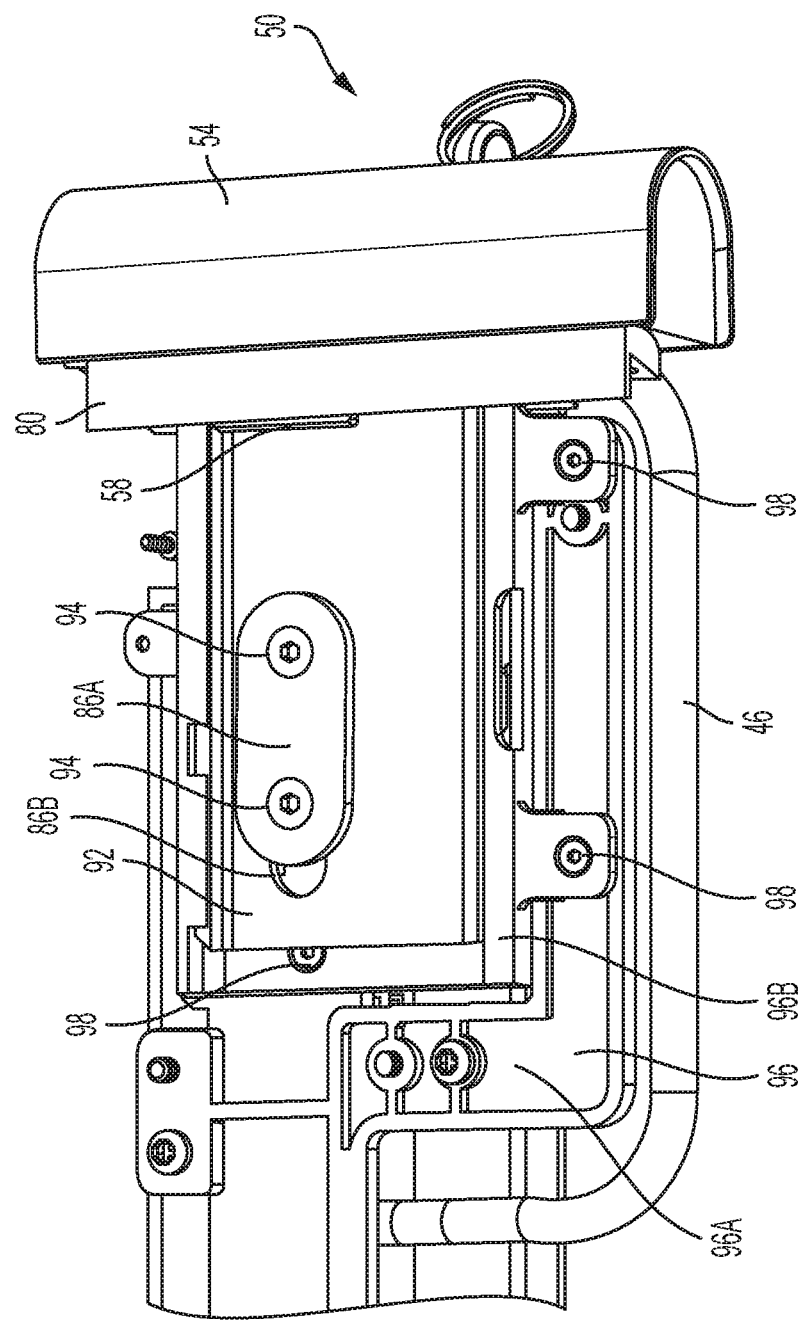
FIG. 11 is a partially deconstructed perspective view of various aspects of the security apparatus of the dock of FIG. 1.

As shown in FIG. 12, when in the second position, the lobe 88A of the cam 84 abuts against a post or protrusion 92A of the plate 92 to inhibit movement of the plate 92 (and the housing 54) relative to the cradle 26 in the direction of arrow B. A second bracket 96 is positioned within the cradle 26 (e.g., within the rear wall 26D of the cradle) and is attached to the locking mechanism 62 (e.g., via threaded fasteners 94). The bracket 96 is, for example, a plastic bracket and assists in locating and providing a smooth guide for the plate 92. As shown in FIG. 11, an oblong plate 86A is fastened to the bracket 96 via the fasteners 94 to hold the bracket 96 to the plate 92 and permit the plate 92 to translate (or otherwise move) relative to the bracket 96 within a slot 86B.

With continued reference to FIGS. 11-12, the second bracket 96 is fixed relative to the cradle 26. The plate 92 is slidable within the second bracket 96 (as limited by the slot 86B and the surrounding bracket 96) such that the housing 54 of the security apparatus 50 is slidable between the engaged and disengaged positions. As shown in FIG. 11, the second bracket 96 includes a first bracket portion 96A and a second bracket portion 96B fixed to the first bracket portion 96A (e.g., via fasteners 98). The plate 92 slides within the second bracket portion 96B. The protrusion 92A interfaces with the cam 84 through an aperture 96C in the second bracket 96.

Figure 13:
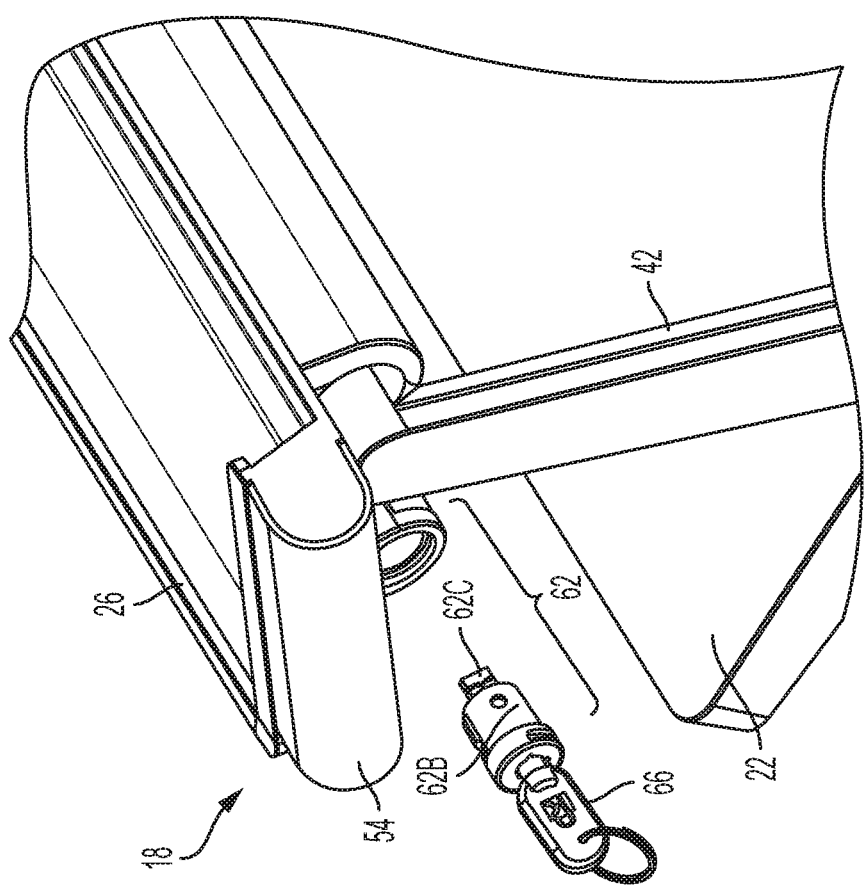
FIG. 13 is a perspective view of a portion of the dock with a locking mechanism removed.

In some embodiments, the locking mechanism 62 may automatically lock the housing 54 and lock head 58 relative to the cradle 26 and the portable electronic device 14 when the security apparatus 50 is placed in the second position. Alternatively, a user may manually lock the locking mechanism 62 (e.g., with the key 66, by depressing a button, with a fingerprint scanner, etc.) upon inserting the lock head 58 into the portable electronic device 14. To remove the portable electronic device 14 from the dock 18, the locking mechanism 62 is manually unlocked (e.g., with a key 66, with an input to the portable electronic device, with a fingerprint scanner, etc.). Once unlocked, the user is operable to manually disengage the lock head 58 from the portable electronic device 14 by moving the housing 54 and lock head 58 away from the cradle 26. Alternatively, the security apparatus 50 may be provided with a retraction device (e.g., spring, motor, etc.) for automatically moving the housing 54 and lock head 58 to the disengaged position. As shown in FIG. 13, the locking mechanism 62 includes a removable lock 62B with a rotatable post 62C in communication with the cam 84 such that rotation of the key 66 rotates the post 62C, which in turn rotates the cam 84. The removable lock 62B is removable from the remainder of the locking mechanism 62 and may be replaceable with a non-functional plug if locking of the cradle 26 is not desired.

Various features and advantages of the invention are set forth in the following claims.

What is claimed is:

1. A dock for a portable electronic device, the dock comprising:
   a base;
   a cradle defining an interior volume configured to house at least a portion of the portable electronic device;
   an arm rotatably coupled to the base at a first end and rotatably coupled to the cradle at a second end; and
   a security apparatus configured to be inserted into a port of the portable electronic device upon insertion of the portable electronic device into the cradle to prohibit removal of the portable electronic device from the dock,
   wherein the cradle is rotatable relative to the base about a first axis defined at the first end of the arm and about a second axis defined at the second end of the arm, the second axis being parallel to the first axis, and
   wherein the security apparatus includes a data and power transmission apparatus, wherein the base includes one or more ports, and wherein the data and power transmission apparatus is electrically connected to the one or more ports.

2. The dock of claim 1, wherein the cradle is rotatable relative to the arm about the first axis independent of rotation of the arm relative to the base about the second axis.

3. The dock of claim 1, wherein the dock is operable to rotate about the first axis and the second axis to transition between a vertical desktop orientation and a horizontal tablet orientation.

4. The dock of claim 1, wherein the security apparatus is mounted to the cradle.

5. The dock of claim 4, wherein the security apparatus includes a lock head movable relative to the dock between an engaged position and a disengaged position.

6. The dock of claim 5, wherein the security apparatus further includes a locking mechanism operable to lock the security mechanism in the engaged position.

7. The dock of claim 1, further comprising a security cable fixed to the base and to the cradle, wherein the security cable extends through the arm.

8. The dock of claim 1, wherein the arm is a first arm, the dock further comprising a second arm rotatably coupled to the base at a first end and rotatably coupled to the cradle at a second end.

9. A dock for a portable electronic device, the dock comprising:
   a base configured to rest upon a work surface;
   a cradle having a lower channel, a first side channel extending perpendicularly from a first end of the lower channel, and a second side channel extending perpendicularly from a second end of the lower channel opposite the first end;
   an arm rotatably coupled to the base at a first end and rotatably coupled to the cradle at a second end, and
   a security apparatus coupled to the cradle at the second side channel and operable to prohibit removal of the portable electronic device from the dock, the security apparatus having a lock head configured to extend into the second side channel toward the first side channel;
   wherein each of the lower channel, the first side channel, and the second side channel is configured to accept an edge of the portable electronic device, and
   wherein the security apparatus includes an electrical connector that is insertable into a port of the portable electronic device.

10. The dock of claim 9, wherein the base supports one or more ports electrically connected to the electrical connector, and wherein the electrical connector is insertable into the portable electronic device when the portable electronic device is positioned within the cradle.

11. The dock of claim 10, wherein electrical wiring extends through the arm to connect the electrical connector to the one or more ports.

12. A method of docking a portable electronic device to a dock, the dock including a base, an arm rotatably coupled to the base, a cradle mounted to the base via the arm, and a locking apparatus supported by the cradle and having an electrical connector, the method comprising:

positioning the locking apparatus in a disengaged position such that the electrical connector does not extend into a channel defined by the cradle;

inserting the portable electronic device into the cradle such that the cradle at least partially surrounds a plurality of the sides of the portable electronic device;

moving the locking apparatus into an engaged position such that the electrical connector extends into the channel and engages the portable electronic device; and locking the locking apparatus in the engaged position.

13. The method of claim 12, wherein moving the locking apparatus into the engaged position further comprises pushing the locking apparatus toward the cradle.

14. The method of claim 12, wherein the cradle is at least partially defined by a lower channel, a first side channel, and a second side channel, wherein inserting the portable electronic device into the cradle includes inserting a first edge of the electronic device into the lower channel, inserting a second edge of the portable electronic device into the first side channel, and inserting a third edge of the portable electronic device into the second side channel.

15. The dock of claim 5, wherein the security apparatus is supported by the cradle in both the engaged position and the disengaged position.

16. The dock of claim 9, wherein the lock head includes the electrical connector.

17. A dock for a portable electronic device, the dock comprising:

a base;

a cradle defining an interior volume configured to house at least a portion of the portable electronic device;

an arm rotatably coupled to the base at a first end and rotatably coupled to the cradle at a second end; and a security apparatus configured to be inserted into a port of the portable electronic device upon insertion of the portable electronic device into the cradle to prohibit removal of the portable electronic device from the dock, wherein the cradle is rotatable relative to the base about a first axis defined at the first end of the arm and about a second axis defined at the second end of the arm, the second axis being parallel to the first axis, wherein the security apparatus is mounted to the cradle, wherein the security apparatus includes a lock head movable relative to the dock between an engaged position and a disengaged position, and wherein the base supports one or more electrical ports, and wherein the lock head includes an electrical connector operable to electrically connect the portable electronic device to the one or more electrical ports.

* * * * *